No. 800,476. PATENTED SEPT. 26, 1905.
M. R. NORMAN.
PLANTER AND FERTILIZER DISTRIBUTER.
APPLICATION FILED JAN. 31, 1905.

2 SHEETS—SHEET 1.

Witnesses

Inventor
M. R. Norman.
By Lacey, Attorneys

No. 800,476. PATENTED SEPT. 26, 1905.
M. R. NORMAN.
PLANTER AND FERTILIZER DISTRIBUTER.
APPLICATION FILED JAN. 31, 1905.
2 SHEETS—SHEET 2.
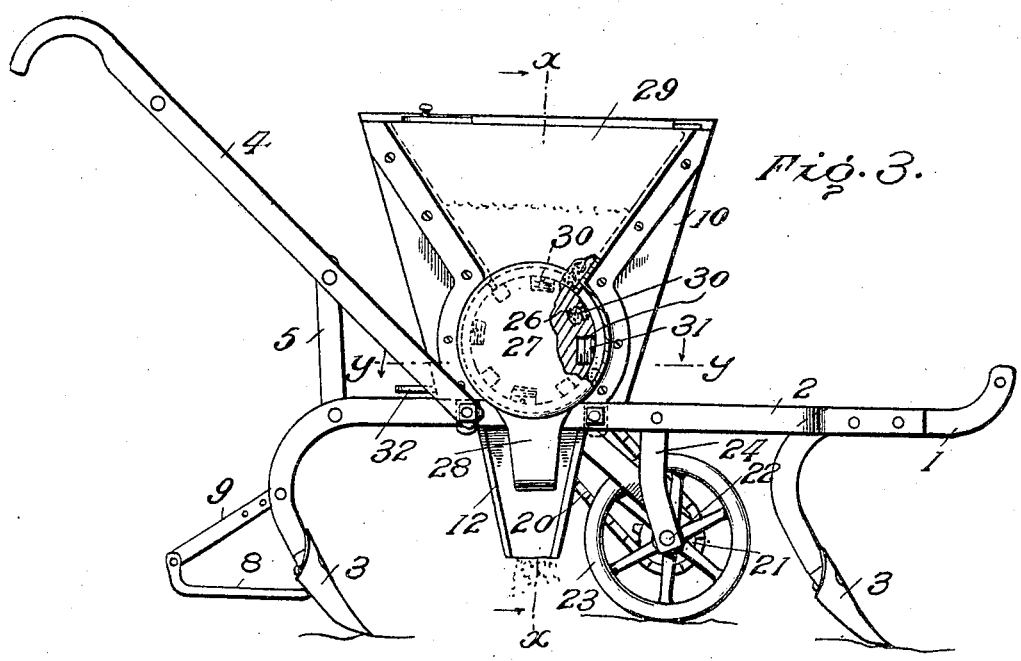
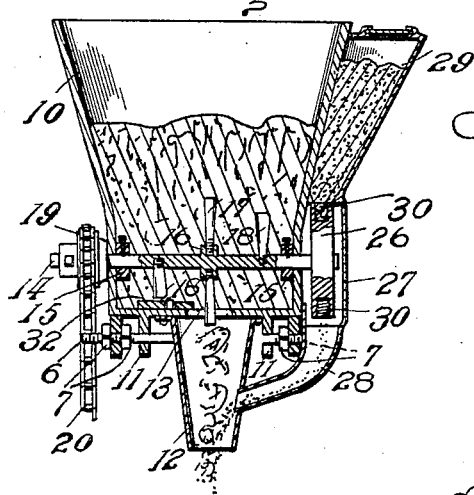
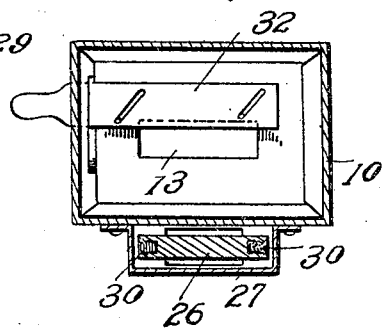
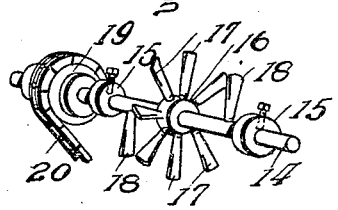
Inventor
M. R. Norman

UNITED STATES PATENT OFFICE.

MOSCOW R. NORMAN, OF MONTGOMERY, ALABAMA.

PLANTER AND FERTILIZER-DISTRIBUTER.

No. 800,476.         Specification of Letters Patent.         Patented Sept. 26, 1905.

Application filed January 31, 1905. Serial No. 243,525.

*To all whom it may concern:*

Be it known that I, MOSCOW R. NORMAN, a citizen of the United States, residing at Montgomery, in the county of Montgomery and State of Alabama, have invented certain new and useful Improvements in Planters and Fertilizer-Distributers, of which the following is a specification.

The purpose of this invention is to provide an implement of novel structure which may be used either as a cultivator, a fertilizer-distributer, or a planter, or for any combination thereof.

The implement comprises a frame consisting of beams and standards adapted to receive shovels of any type, a hopper for receiving fertilizer, and operating means for effecting a positive discharge of fertilizer at predetermined intervals and in regulable quantities, said hopper and operating means being detachably fitted to the frame of the implement, so as to be laid aside when the device is to be used in the capacity of a cultivator solely.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1:
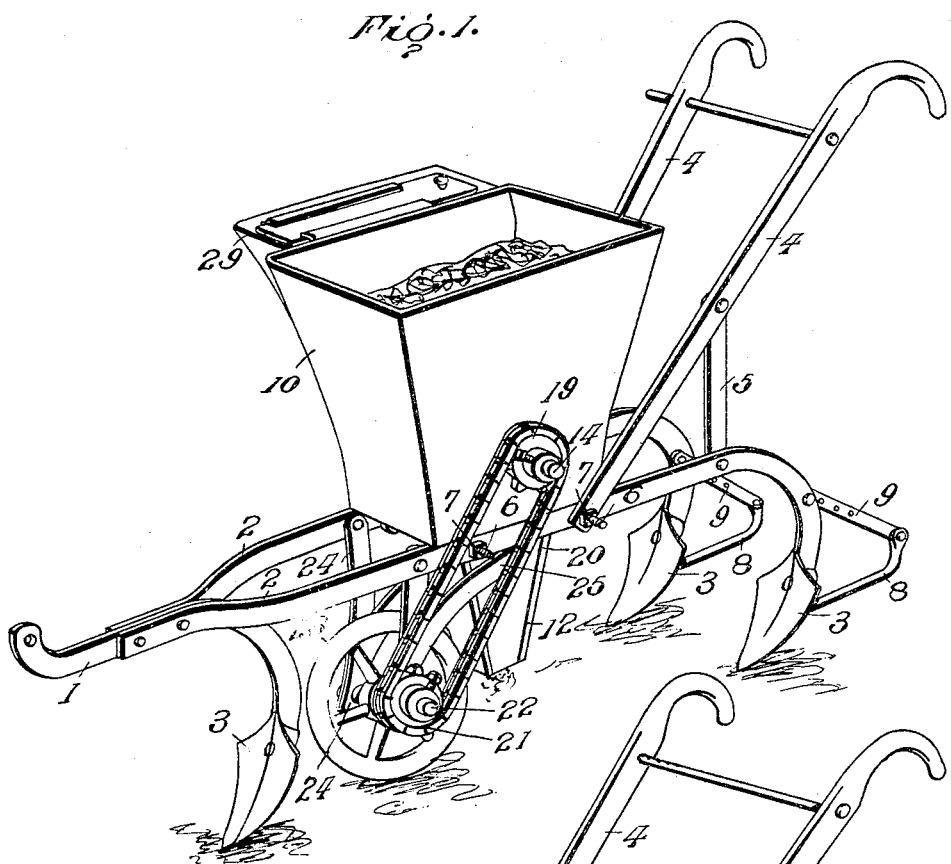
Figure 2:
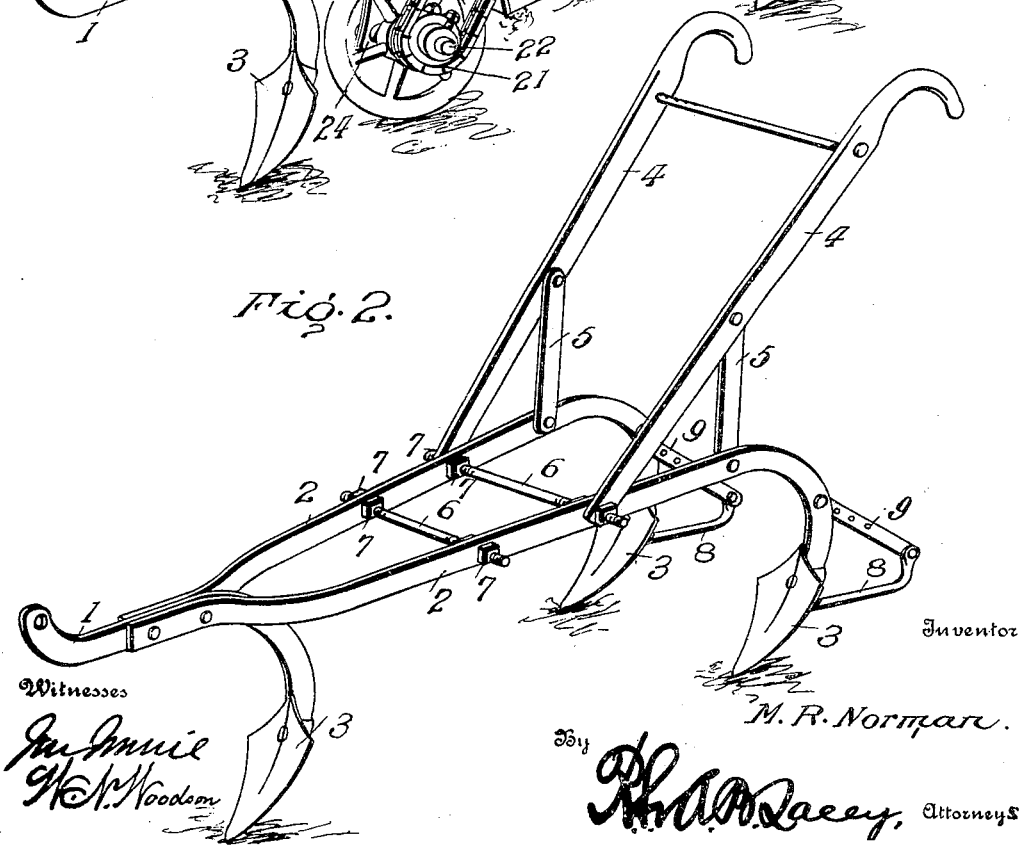

Figure 1 is a perspective view of an implement fully rigged and embodying the essential features of the invention. Fig. 2 is a perspective view of the implement stripped of the hopper and operating means. Fig. 3 is a view of the implement in side elevation, a portion of the grain-hopper and grain-wheel being broken away. Fig. 4 is a transverse section of the implement on the line $x$ $x$ of Fig. 3 looking in the direction of the arrows. Fig. 5 is a horizontal section on the line $y$ $y$ of Fig. 3; and Fig. 6 is a detail perspective view of the shaft provided with the grain-wheel, fertilizer-distributer, and agitators.

Corresponding and like parts are referred to in the following description and indicated in all the views of the drawings by the same reference characters.

The frame of the implement comprises a middle beam 1 and similar side beams 2, the latter being converged at their front ends and secured to opposite sides of the middle beam 1. The rear portions of the several beams are curved downward to form standards to which are attached shovels 3 of any design, according to the special work to be performed. The middle beam 1 is extended forward of the beams 2 and is curved upward and transversely apertured and is adapted to have the draft applied thereto in the usual manner. Handle-bars 4 are connected at their lower ends to the beams 2 and are supported by means of braces 5. The beams 2 are adapted to be spread more or less, according to the required transverse distance of the rear shovels 3, and for this purpose rods 6 are provided and have their end portions threaded and passed through openings of the beams 2 and supplied with pairs of set-nuts 7. By proper manipulation of the set-nuts 7 the distance between the rear ends of the beams 2 may be regulated within certain limits.

It is proposed to regulate the depth of operation of the rear shovels, and this is accomplished by means of runners 8, which are pivotally connected at their front ends to the rear standards and are adjustable vertically at their rear ends by means of braces 9, which have adjustable connection with the rear standards in any determinate way.

The fertilizer-distributer comprises a hopper 10, which is detachably connected to the frame of the implement in any manner and, as shown, is provided with pendent lugs 11, through which the rods 6 pass. A spout 12, pendent from the hopper 10, is in communication at its upper end with said hopper by means of an opening 13, formed in the bottom thereof. A shaft 14 is journaled in side portions of the hopper and is prevented from longitudinal displacement by means of set-collars 15, secured thereto and arranged to engage with the inner walls of the hopper. A distributer or feeder is secured to the shaft 14 and consists of a hub 16 and arms or blades 17, threaded or otherwise connected at their inner ends to the hub 16 in order to admit of their ready detachment. By removal of all of the arms or blades 17, with the exception of one, fertilizer will be distributed once during each revolution of the shaft 14. By leaving arms or blades at opposite points fertilizer will be deposited twice during each revolution of the shaft 14. Agitators 18 are fitted to the shaft 14 at each side of the feeder and stir the fertilizer to prevent its sticking in the hopper and insure positive feed thereof. A sprocket-wheel 19 is secured to the projecting end of the shaft 14 and motion is imparted thereto by means of a sprocket-chain 20 from a companion sprocket-wheel 21, fast upon the axle 22 of ground-wheel 23. The axle 22 is journaled in bearings at the lower ends of standards 24, the latter being stayed by means of braces 25. For depositing grain a distributing-wheel 26 is fast upon the opposite end portion of shaft 14 and is inclosed by means of a casing 27, having an opening at the top and bottom, said casing being secured to a side of the hopper-frame, as shown most clearly in Fig. 3. A spout 28 connects the lower portion of the casing 27 with a side of the spout 12 to supply grain thereto. A hopper 29, attached to the same side of the hopper 10 as the casing 27, receives the grain to be planted. The distributing or grain wheel 26 is provided in its periphery with a series of pockets or openings for reception of the grain to be deposited. The pockets or openings 30 are of different capacity, according to the nature and amount of grain to be deposited in a hill. Inasmuch as all the pockets are not used at one time, those not in use are closed by plugs 31, which may be of any material and held in place in a manner to admit of their ready removal, yet prevent their casual displacement.

The opening 13 in the bottom of the hopper 10 is adapted to be regulated by means of a cut-off 32, the same consisting of a plate slidably mounted with reference to the hopper and adapted to be secured in a located position.

For cultivating, the hopper 10 and operating mechanism are removed, and the implement will appear as illustrated in Fig. 2. For sowing fertilizer the implement will appear as shown in Figs. 1 and 3, the fertilizer being supplied to the hopper 10. If grain only is to be dropped, the hopper 29 is charged, and if both fertilizer and grain are to be dropped the hoppers 10 and 29 are supplied, as indicated in Fig. 4.

Having thus described the invention, what is claimed as new is—

In combination longitudinal beams provided with shovel-blades, a hopper provided with a spout, means for securing the hopper to said beams and connecting the latter a shaft journaled in opposite sides of the hopper and provided with a force-feeder and agitators, a grain-wheel fast upon the projecting end of said shaft, a casing inclosing said grain-wheel, a spout leading from said casing and in communication with the spout of the first-mentioned hopper, a supplemental hopper in communication with the upper portion of said casing and attached to the same side of the main hopper with said casing, a ground-wheel and means for transmitting motion from said ground-wheel to the aforesaid shaft, substantially as set forth.

In testimony whereof I affix my signature in presence of two witnesses.

MOSCOW R. NORMAN. [L. S.]

Witnesses:
JOSEPH CALLAWAY,
RICHARD H. JONES.